United States Patent [19]

Goetz et al.

[11] 4,195,666

[45] Apr. 1, 1980

[54] QUARTZ BALL VALVE

[76] Inventors: Robert A. Frosch, Administrator of the National Aeronautics and Space Adminstration, with respect to the invention of Carl Goetz; William M. Ingle, both of Phoeniz, Ariz.

[21] Appl. No.: 938,300

[22] Filed: Aug. 31, 1978

[51] Int. Cl.² .......................................... F16K 31/06
[52] U.S. Cl. ................................. 137/625.4; 251/86; 137/375; 251/138
[58] Field of Search ............... 137/625.4, 375; 251/86, 251/138

[56] References Cited

U.S. PATENT DOCUMENTS

| 1,571,401 | 2/1926 | Erickson | 251/86 X |
| 1,937,246 | 11/1933 | Reedy | 251/86 X |
| 2,805,037 | 9/1957 | Bruce | 251/86 X |
| 3,520,319 | 7/1970 | Jull et al. | 137/111 |
| 3,561,484 | 2/1971 | Taplin | 137/625.4 |
| 3,658,290 | 4/1972 | Peters et al. | 251/368 X |
| 4,098,581 | 7/1978 | Kraft et al. | 251/368 X |

*Primary Examiner*—Arnold Rosenthal
*Attorney, Agent, or Firm*—Monte F. Mott; John R. Manning; Wilfred Grifka

[57] ABSTRACT

A ball valve particularly suited for use in the handling of highly corrosive fluids characterized by a valve housing formed of communicating segments of quartz tubing, a pair of communicating sockets disposed in coaxial alignment with selected segments of tubing for establishing a pair of inlet ports communicating with a common outlet port, a ball formed of quartz material supported for displacement between the sockets and configured to be received alternately thereby, and a valve actuator including a rod attached to the ball for selectively displacing the ball relative to each of the sockets for controlling fluid flow through the inlet ports.

3 Claims, 2 Drawing Figures

QUARTZ BALL VALVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention generally relates to ball valves and more particularly to an improved ball valve formed of quartz having particular utility in the handling of highly corrosive fluids at high temperatures.

2. Description of the Prior Art

The prior art is, of course, replete with numerous valves, many of which include ball-shaped flow control devices. Additionally, a use of a "migrating" ball for controlling fluid flow in a valve has been suggested, for example, see U.S. Pat. No. 3,520,319 to Jull et al.

However, as can be appreciated by those familiar with techniques and materials employed in the production of silicon for semiconductor or solar devices, large quantities of corrosive materials, such as $SiCl_4$ must be handled. Moreover, certain processes require that two or three separate process steps be performed simultaneously employing a common apparatus. As a consequence, it has been found highly desirable to provide a valve capable of isolating specific regions of an apparatus while being subjected to temperatures elevated well above 300° C. Of course, the valve employed must be capable of functioning without significant attendant degredation which, as a practical matter, could lead to contamination of the materials being handled.

It is, therefore, the general purpose of the instant invention to provide an improved valve particularly suited for use in handling highly corrosive fluid materials, both liquids and gases, at high temperatures without experiencing degredation and attendant losses in the utility of the valve.

OBJECTS AND SUMMARY OF THE INVENTION

It is, therefore, an object of the invention to provide an improved ball valve which overcomes the aforementioned difficulties and disadvantages.

It is another object to provide an improved selectively actuatable ball valve particularly suited for use in handling highly corrosive fluids at high temperatures.

Another object is to provide a valve for use in handling large quantities of corrosive fluids in the production of silicon for use in fabrication of semiconductor devices, although not necessarily restricted in use thereto since the valve of the instant invention may be equally useful when employed in other endeavors requiring a handling of corrosive chemicals at high temperatures.

These together with other objects and advantages are achieved through the use of a selectively actuatable ball valve including a housing formed of quartz and having defined therein multiple fluid inlets and at least one fluid outlet, and a socket seat interposed between each of the inlets and the outlets, a ball formed of quartz material configured to be discharged from and received by each of said sockets for opening and closing an associated inlet relative to the outlet, and an actuator including at least one rod supported for rectilinear reciprocation connected with the ball for displacing the ball relative to each socket seat, as will become more readily apparent by reference to the following description and claims in light of the accompanying drawings.

DESCRIPTION OF THE PREFERRED EMBODIMENTS

First Embodiment

Figure 1:
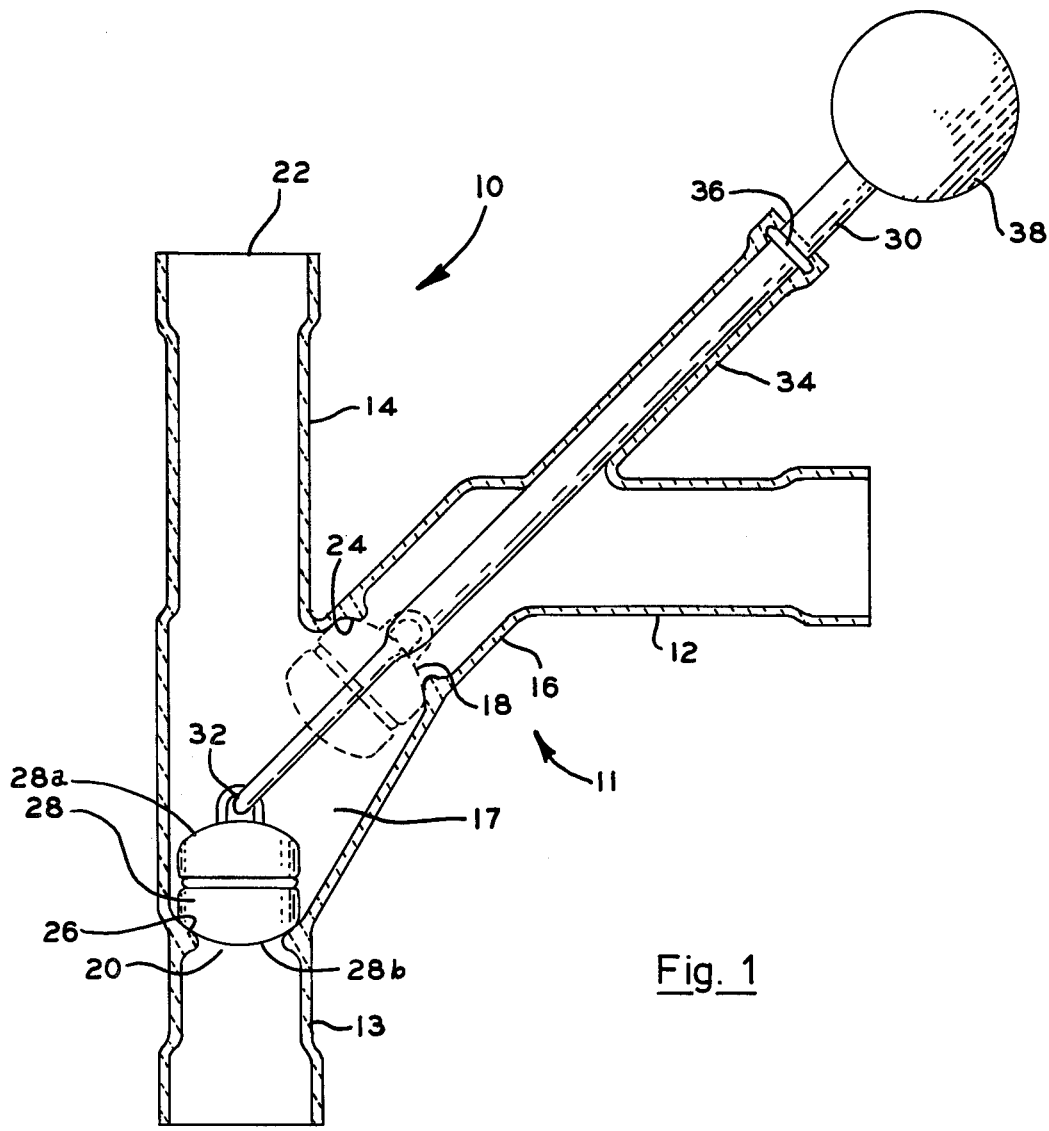
FIG. 1 is a vertically sectioned view of a ball valve comprising one embodiment of the instant invention.

Referring now to the drawings wherein like reference characters designate like or corresponding parts throughout the several views, there is shown in FIG. 1 a valve 10 comprising one embodiment of the instant invention.

While not shown in the drawings, it is to be understood that the valve 10 is particularly adapted to be employed in handling large quantities of corrosive fluids, such as halosilane intermediates often encountered at temperatures well above 300°, in the production of silicon for semiconductor solar devices.

At the outset, it should be understood that the valve 10 includes a housing 11 which is fabricated from a suitable refractory material, preferably quartz. As herein employed, the term refractory relates to heat resistant, non-metallic materials. Preferably, the housing 11 is of a generally T-shaped configuration and includes an inlet conduit 12, an inlet conduit 13 and a discharge conduit 14. Each of the conduits comprises a segment of quartz tubing. While the conduits 12 and 13 are of linear configurations, the segment 12 terminates in an angulated portion 16. The conduits 12, 13 and 14 communicate with a valving chamber 17 common thereto.

As shown in FIG. 1, the portion 16 is coaxially related to an inlet port 18 while the segment 13 is coaxially related to an inlet port 20 and the segment 14 an outlet port 22. As shown, the port 22 is spaced from the chamber 17 in coaxial alignment with the inlet port 20 and in abaxial alignment with the inlet port 18.

Formed in coaxial alignment with the inlet port 18 there is a first socket 24 having a configuration conforming to a segment of a sphere while a second socket 26 of a similar configuration is formed in coaxial alignment with the inlet port 20. These sockets are disposed in mutally spaced abaxial alignment and communicate with the valving chambers 17. Disposed within the chamber 17 and adapted to be seated in each of the sockets 24 and 26 there is a migrating ball 28, also formed of quartz. In practice, the ball 28 includes a first surface 28a of a compound curve configuration conforming substantially to the dimensions and configurations of the socket 24, and a second surface 28b of a dimension and configuration substantially conforming to the dimension and configuration of the socket 26. Preferably, the surfaces 28a and 28b are characterized by a common radius and are arranged in axially spaced relation. Thus the ball 28 is adapted to be moved between the sockets 24 and 26 and be seated for forming a fluid tight seal between the contacting surfaces thereof. Thus the operation of the valve is dictated by the position of the ball 28 relative to the sockets.

At this juncture, it is important to note that repositioning of the ball is effected through manipulation of a push-pull rod 30. The rod 30 is connected to the ball 28 by an articulated coupling 32 comprising a pair of interconnected eyes, one being formed at one end of the rod 30 and the other being projected from the surface 28a of the ball. It should now be apparent that the ball 28 is repositioned relative to the sockets simply by imparting axial displacement to the rod 30.

The rod 30, as shown in FIG. 1, projects through a sleeve 34 integrally related to the tube segment 12 and coaxially aligned with the inlet port 18. Preferably, the surface of the rod 30 is polished while the sleeve is provided with an O-ring 36 seated in the sleeve for purposes of establishing between the sleeve and the rod a fluid tight seal. The O-ring may be formed of any suitable material such as dynamic Viton or Teflon as desired. However, in order to assure minimal O-ring degredation, the O-ring should be so that the temperature of the O-ring remains below 250° C.

As an aid to manipulation, the rod 30 is provided with a suitable grip or handle 38 located at its extremity in a convenient location relative to the valve housing. In operation, an operator simply grasps the handle 38 and axially displaces the rod 30 for displacing the ball. Thus the surface 28a of the ball is caused to seat against the surface of the socket 24 or against the surface 28b against the surface of the socket 26. With the ball 28 seated in the socket 26, a first flow path established from the tube segment 16 through the inlet port 18, and thence through the outlet port 22, while the port 20 remains in a closed condition due to the presence of the ball. Similarly, with the ball 28 received in the socket 24 a second flow path is established which extends through the inlet port 20 and thence through the outlet port 22, while the first flow path is interrupted at the inlet port 18 as a consequence of the presence of the socket 24 of the ball 28.

Further Embodiment

Figure 2:
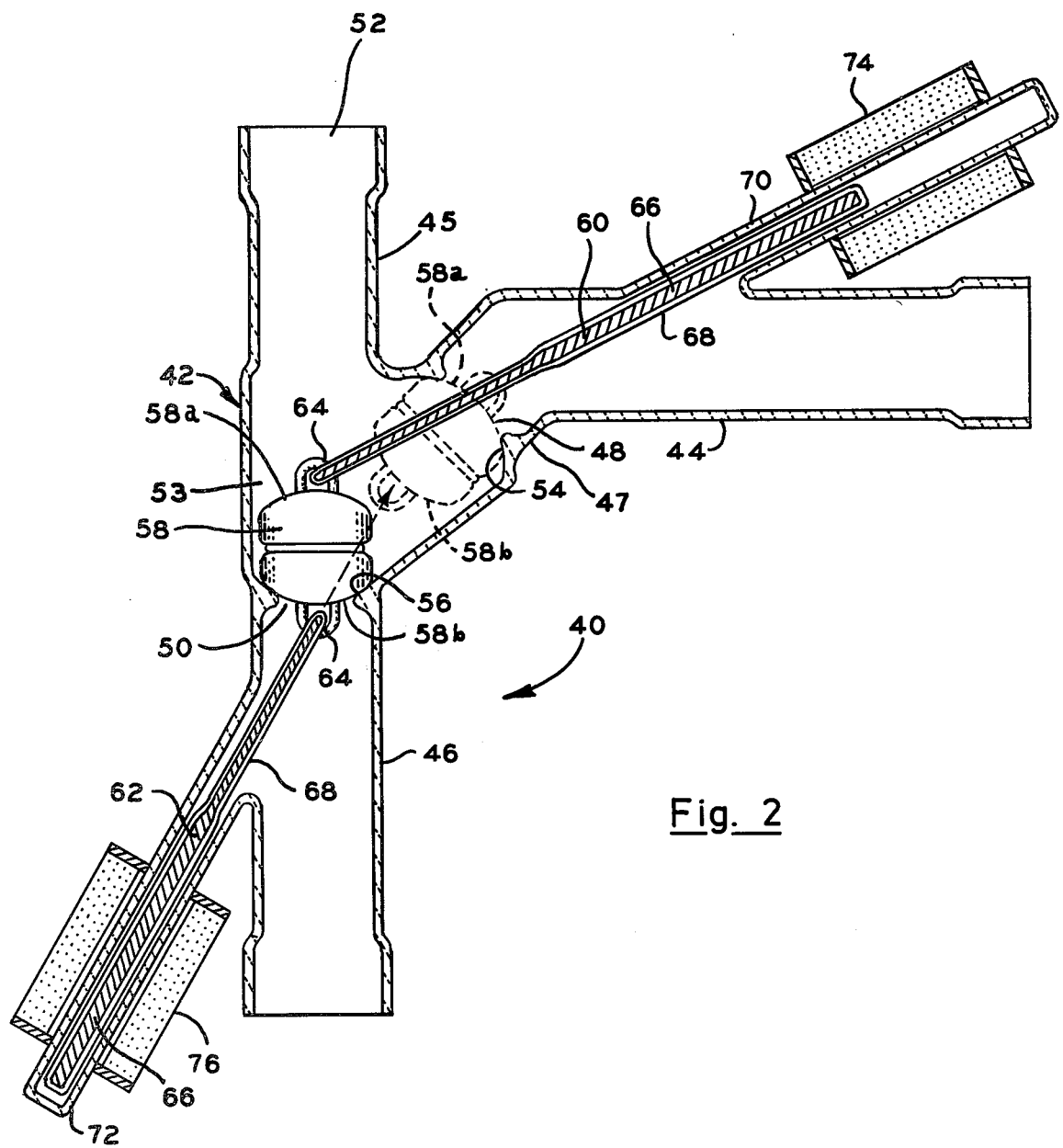
FIG. 2 is a vertically sectioned view of a further embodiment of the invention.

Turning now to FIG. 2, wherein is illustrated a valve 40 constituting a further embodiment of the invention.

It will be appreciated from even a cursory review of FIG. 2 that the valve 40 is similar in many respects to the valve 10. For example, note that the valve 40 includes a housing 42, also of a generally T-shaped configuration. The housing 42 also includes segments of quartz tubing, designated 44, 45 and 46. While the segments 45 and 46 are of linear configuration, the segment of tubing 44 terminates in an angulated portion 47. The portion 47 includes an inlet port 48, the segment 46 includes an inlet port 50 and the segment 45 includes an outlet port 52 provided in remote relation to the ports 48 and 50. The ports 48, 50 and 52 communicate with a valving chamber 53, commonly related thereto. The ports 50 and 52 are arranged in coaxial alignment while the port 48 is abaxially aligned with both of the ports 50 and 52.

Disposed in coaxial juxtaposition with the port 48 is a first socket 54, while a second socket 56 is disposed in coaxial juxtaposition with the inlet port 50. The surfaces of these sockets also are of a compound configuration generally conforming to that of segments of a sphere. Interposed between the sockets 54 and 56, defined within the chamber 53, there is a ball 58 having a first surface 58a dimensioned and configured to be received in the socket 54, in sealing relation therewith, and a second surface 58b dimensioned and configured to be received by the socket 56, in sealing relation therewith, whereby the ball 58 is adapted to be received in the sockets 54 and 56 with a fluid-tight seal being established between the contiguous surfaces thereof.

It is important here to note, however, that connected to the ball 58, at the surface 58a, there is a first actuator rod 60. Also connected to the ball 58, at the surface 58b, there is a second actuator rod 62. Again, a suitable articulated coupling, designated 64, is provided for coupling the actuator rods 60 and 62 with the ball 58, at opposite surfaces thereof. Like the coupling 32, the couplings 64 comprise interconnected eyes formed on the rods and projected from the surface of the ball 58.

It is important to note that each of the actuator rods 60 and 62 include a core 66. Each core comprises a steel bar, encapsulated by a layer 68 of quartz. Moreover, it is noted that the actuator rod 60 is sealed in a first sleeve 70, the axis of which passes through the inlet port 48, while the actuator rod 62 is seated in a sleeve 72, the axis of which passes through the inlet port 50. Concentrically related to the sleeves 70 and 72, there are electrical windings 74 and 76 for alternately establishing electromagnetic fields about the core 66 for the actuator rods 60 and 62, respectively. It should now be understood that the cores 66 function as solenoid cores and in response to voltages applied across the coils 74 and 76 are displaced in axial directions for displacing the ball 58 relative to the sockets 54 and 56 for opening and closing the inlet ports 48 and 50, respectively.

The operation of the valve 40 is similar in many respects to the operation of the valve 10, hereinbefore described.

With the ball 58 seated in the socket 56, as shown, a first flow path is established from the tubular segment 44 through the inlet port 48 and thence to the outlet port 52 while a second flow path extended through the inlet port 50 to the outlet port 52 is interrupted as a consequence of the ball 58 being present and seated in sealing relation with the socket 56. However, upon the coil 74 being energized and, simultaneously, the coil 76 being de-energized the core 66 of the actuator rod 60 is drawn toward the coil 74, for causing the ball 58 to be lifted from the socket 56 and seated in the socket 54. Thus the inlet port 48 is closed and the inlet port 50 opened. Consequently, the continuity of the second flow path through the inlet port 50 to the outlet port 52 is established, while the flow path through the inlet port 48 to the outlet port 52 is interrupted.

In view of the foregoing, it is believed to be readily apparent that the valves 10 and 40 provide practical solutions to the problem of controlling the flow of high-temperature corrosive fluids.

What is claimed is:

1. A selectively actuatable ball valve comprising:
  A. a valve housing formed of refractory material having means defining therein a fluid inlet port, a fluid outlet port, and a pair of mutually spaced, adjacently related socket seats disposed in communicating relation with the fluid inlet port and the fluid outlet port;
  B. a ball formed of refractory material configured to be received in and discharged from each of said socket seats for alternately opening and closing said inlet port and said outlet port; and
  C. valve actuator means for displacing said ball relative to said socket seats including a pair of rods, each rod of said pair being connected to said ball and supported for rectilinear reciprocation for displacing the ball relative to said socket seats.

2. The valve of claim 1 wherein said valve housing and said ball are formed of quartz, each of said rods comprises a quartz encapsulated steel bar and said actuator further includes means for selectively establishing about the rods an electromagnetic field for imparting thereto rectilinear motion.

3. A ball valve particularly suited for use in handling highly corrosive fluids at high temperatures comprising:
  A. a valve housing of a T-shaped configuration formed of communicating segments of quartz tubing;
  B. means defining in said housing a first socket disposed in coaxial alignment with a first segment of tubing for establishing a first inlet port for said valve, and a second socket adjacently related to said first socket disposed in coaxial alignment with a second segment of tubing for establishing a second inlet port for said valve; and
  C. valve closure means for selectively closing said first and second ports including a ball formed of quartz material supported for displacement between said ports and configured to be received alternatively thereby, and valve actuator means for selectively displacing said ball relative to each of said ports including a pair of quartz-encapsulated steel rods extended through the ports and connected to said ball at opposite sides thereof, a selectively energizable coil concentrically related to each rod of said pair for establishing thereabout an electromagnetic field, whereby axial displacement is imparted to said rods for responsively displacing the ball relative to said ports.

* * * * *